(12) United States Patent
Witkowski et al.

(10) Patent No.: US 7,761,403 B2
(45) Date of Patent: Jul. 20, 2010

(54) RUN-TIME OPTIMIZATIONS OF QUERIES WITH SQL SPREADSHEET

(75) Inventors: Andrew Witkowski, Foster City, CA (US); Srikanth Bellamkonda, Sunnyvale, CA (US); Tolga Bozkaya, Belmont, CA (US); Abhinav Gupta, Santa Clara, CA (US); Nathan Folkert, Palo Alto, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1700 days.

(21) Appl. No.: 10/703,412

(22) Filed: Nov. 6, 2003

(65) Prior Publication Data

US 2004/0133567 A1 Jul. 8, 2004

Related U.S. Application Data

(60) Provisional application No. 60/424,957, filed on Nov. 7, 2002.

(51) Int. Cl.
*G06F 17/30* (2006.01)
(52) U.S. Cl. .................. 707/4; 707/2; 707/7; 707/8; 707/9; 707/10
(58) Field of Classification Search ............... 707/1–10, 707/100–104.1, 200–206
See application file for complete search history.

(56) References Cited

U.S. PATENT DOCUMENTS 5,319,777 A 6/1994 Perez
5,359,724 A 10/1994 Earle ........................ 707/205
5,485,608 A 1/1996 Lomet et al.
5,819,282 A 10/1998 Hooper et al.
5,870,760 A 2/1999 Demers et al.
5,943,668 A 8/1999 Malloy et al.

(Continued)

FOREIGN PATENT DOCUMENTS

JP 411161656 A 6/1999

(Continued)

OTHER PUBLICATIONS

European Patent Office, "Communication pursuant to Article 96(2) EPC," Aug. 22, 2004, 4 pages.

(Continued)

*Primary Examiner*—Isaac M Woo
(74) *Attorney, Agent, or Firm*—Hickman Palermo Truong & Becker LLP

(57) ABSTRACT

Described herein are optimizations and execution strategies for spreadsheet extensions to SQL. The partitioning of data, as specified in a spreadsheet clause, provides a way to parallelize the computation of spreadsheet and to provide and improve scalability. Even if the partitioning is not explicitly specified in the spreadsheet clause, the database optimizer can automatically infer the partitioning in some cases. Efficient hash based access structures on relations can be used for symbolic array addressing, enabling fast computation of formulas. When rewriting SQL statements, formulas whose results are not referenced in outer blocks can be removed from the spreadsheet clause, thus removing unnecessary computations. The predicates from other query blocks can be moved inside query blocks with spreadsheets clauses, thus considerably reducing the amount of data to be processed. Conditions for validity of this transformation are given.

50 Claims, 8 Drawing Sheets

Classification Diagram

U.S. PATENT DOCUMENTS

| | | | |
|---|---|---|---|
| 5,978,796 | A | 11/1999 | Malloy et al. |
| 6,298,342 | B1 * | 10/2001 | Graefe et al. ............... 707/4 |
| 6,317,750 | B1 | 11/2001 | Tortolani et al. |
| 6,389,410 | B1 | 5/2002 | Gupta |
| 6,434,544 | B1 | 8/2002 | Bakalash et al. ............ 707/2 |
| 6,615,241 | B1 | 9/2003 | Miller et al. |
| 6,622,138 | B1 | 9/2003 | Bellamkonda et al. |
| 6,631,371 | B1 | 10/2003 | Lei et al. |
| 2002/0107754 | A1 | 8/2002 | Stone |
| 2004/0133567 | A1 | 7/2004 | Witkowski et al. |
| 2004/0133568 | A1 | 7/2004 | Witkowski et al. |
| 2007/0192336 | A1 | 8/2007 | Iyer et al. |

FOREIGN PATENT DOCUMENTS

WO    WO 99/48029    9/1999

OTHER PUBLICATIONS

"New Claims, (Clean Copy)," Current claims from International Application No. 01984272.3, pp. 48-50, Aug. 22, 2004.

Gray, J., et al. "Data Cube: A Relational Aggregation Operator Generalizing Group-By, Cross-Tab, and Sub-Totals" Feb. 26, 1996, IEEE, XP01058909, pp. 152-159.

Mark Rittman, "The New Oracle 10g SQL MODEL Clause," Breaking Oracle News, http://dba-oracle.com/oracle_news/2004_1_15_rittman.htm, data retrieved Apr. 8, 2004, pp. 1-4.

Mohan, C. et al., "Aries-RRH: Restricted Repeating of History in the Aries Transaction Recovery Method," Proceeding of the Seventh International Conference on Data Engineering, Apr. 18-20, 1991, IEEE 1991, pp. 718-727.

Invitation pursuant to Article 96(2) and Rule 51(2) EPC from corresponding European case 01984272.3, Dec. 22, 2004.

Current claims of corresponding European case 01984272.3, Dec. 22, 2004.

Lane, Paul, "Oracle Database Data Warehouses Guide", 10g Release 1(10.1), Oracle Corporation, Dec. 2003, 81 pages.

Haydu, John, "The SQL Model Clause of Oracle Database 10g", Oracle Corporation, Aug. 2003, 20 pages.

J.M. Hellerstein and M. Stonebraker, "Predicate migration: Optimizing queries with expensive predicates, "Proceedings of ACM SIGMOD 2003, Washington DC, 1993.

* cited by examiner

Procedure *GenLevels*

```
GenLevels(G) {
    LEVEL <- 1
    WHILE (F is not empty) {
        Find the set FS of all the SOURCES in F
        If (cycle is detected) {
            break the cycle /* see below */
        } else if (FS contains single_refs) {
            assign single_refs in FS to level LEVEL;
            F = F - single_refs in FS
        } else (FS contains only scans) {
            assign formulas in FS to level LEVEL;
            F = F - FS
        }
        LEVEL <- LEVEL + 1;
    }
}
```

FIG. 1

F1: s['tv', 2000] = sum(s)['tv', 1990<t<2000],
F2: s['vcr',2000] = sum(s)['vcr', 1995<t<2000],
F3: s['vcr',1999]=s['vcr',1997]+s['vcr',1998]

Procedure *PruneFormulas*

```
PruneFormulas(G)
{
    Find a set FS of all SINKS
    WHILE (FS is not empty) {
       Pick a formula Fi from FS,
       FS = FS - {Fi}    /* remove Fi from FS */

If (all the cells referenced on the left
          side of Fi are filtered out in the outer
          query block
            OR
       the measure updated by the left side
       of Fi is not referenced in the outer
       query block)
       {
          F = F - {Fi} /* delete Fi from list F */
          E = E - {all incoming edges into Fi}, If deletion of F generates new 'sink'
          nodes, insert them into the set FS
       }
    }
}
```

FIG. 3

Procedure *FindNullableMeasures*

Examination of Rules for NULLable upsert measures

1) For each measure m that appears on the left side of an upsert formula:
    1.1) For each Upsert Formula F that has m on its left side:
        1.1.1) Assume each spreadsheet cell reference (from main spreadsheet) is a NULL value
        1.1.2) Determine if the evaluation of right side would produce a NULL result.
        1.1.3) If the right side is not guaranteed to generate a NULL result, continue from step 1 with the next 'upsert' measure.
    1.2) Flag measure m as NULL_IF_EMPTY_PARTITION Procedure *FindNullableMeasures*

Examination of Rules for NULLable upsert measures

1) For each measure m that appears on the left side of an upsert formula:
    1.1) For each Upsert Formula F that has m on its left side:
        1.1.1) Assume each spreadsheet cell reference (from main spreadsheet) is a NULL value
        1.1.2) Determine if the evaluation of right side would produce a NULL result.
        1.1.3) If the right side is not guaranteed to generate a NULL result, continue from step 1 with the next 'upsert' measure.
    1.2) Flag measure m as NULL_IF_EMPTY_PARTITION

FIG. 4A

Procedure *NullableMeasFiltered*

Examination to determine if null values of measures are filtered out

1) Let L be the top level outer filter.
2) if L is a conjunction (an AND node)
   2.1) Call this algorithm recursively on each child of L. If any one of these recursive calls returns TRUE, return TRUE.
   2.2) Return FALSE.
3) if L is a disjunction (an OR node)
   3.1) Call this algorithm recursively on each child of L. If any one of these recursive calls returns FALSE, return FALSE.
   3.2) Return TRUE.
4) if L is a predicate, check if the predicate implies that a measure flagged with NULL_IF_EMPTY_PARTITION cannot take NULL value. If so, return TRUE, otherwise return FALSE.

FIG. 4B

Procedure *Auto-Acyclic*

```
Auto-Acyclic()
{
   for each partition P in the spreadsheet
   {
      for level L_i from L_1 to L_n
      {
         /* LS_i = set of formulas in Li with
          *        single cell refs on left side
          * LE_i = set of formulas in Li with exist-
          *        ential conditions on left side
          *
          * First, evaluate all aggregates in set
          * LS_i, then all formulas in that set
          */
         for each record r in P                   - (I)
            for each aggregate A in LS_i
               apply r to A;
         for each formula F in LS_i
            evaluate F;

/* Evaluate all formulas in LE_i */ for each record r in P                   - (II)
         {
            find all formulas EF in LE_i to be
               evaluated for r
            for each record r' in P               - (III)
               for each aggregate A in EF
                  apply r' to A;
            for each formula EF
               evaluate EF;
         }
      }
   }
}
```

FIG. 6

RUN-TIME OPTIMIZATIONS OF QUERIES WITH SQL SPREADSHEET

RELATED APPLICATION

The present application claims priority to U.S. Provisional Application No. 60/424,957, entitled "Optimizations of Queries with SQL Spreadsheet", filed on Nov. 7, 2002 by Andrew Witkowski, et al., the entire contents of which are incorporated herein by reference.

FIELD OF THE INVENTION

The present invention relates to optimizing the evaluation of queries, and in particular, optimizing the evaluation of queries that include spreadsheet clauses.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One of the most successful analytical tools is a spreadsheet. A user can enter business data, define formulas over it using two-dimensional array abstractions, construct simultaneous equations with recursive models, pivot data and compute aggregates for selected cells, and apply a rich set of business functions. They also provide a flexible user interface with graphs, reports, etc.

Unfortunately, analytical usefulness of the RDBMS (Relational Database Management System) has not measured up to that of spreadsheets or specialized MOLAP (Multidimensional OnLine Analytical Processing) tools. It is cumbersome and in most cases inefficient to perform array-like calculations in SQL—a fundamental problem resulting from lack of language constructs to treat relations as arrays and to define formulas over them and a lack of efficient random access methods for inter-row calculations.

Spreadsheets, on the other hand, have their own problems. They offer two dimensional "row-column" addressing, i.e. physical addressing using row and column offsets. Hence, it is hard to build a symbolic model where formulas reference actual data values. A significant scalability problem exists when either the data set is large (can one define a spreadsheet with terabytes of sales data?) or the number of formulas is significant (can one process tens of thousands of spreadsheet formulas in parallel?). In collaborative analysis with multiple spreadsheets, consolidation is difficult as it is nearly impossible to get a complete picture of the business by querying multiple spreadsheets each using its own layout and placement of data. There is no standard metadata or a unified abstraction inter-relating them akin to RDBMS dictionary tables and RDBMS relations.

To address gaps left by spreadsheets or by RDBMS, SQL has been extended to include language constructs, referred to herein as spreadsheet extensions, that allow relations to be treated as n-dimensional arrays and that allow formulas to be defined in terms of the n-dimensional arrays. Formulas are encapsulated in a new SQL clause, referred to as a spreadsheet clause, that supports partitioning of the data. The spreadsheet extensions enable RDBMs to provide many of the advantages inherent to both RDBMS and spreadsheets.

To execute SQL statements more efficiently, RDBMs have a component, called a query optimizer, that rewrites queries into forms that may be evaluated more efficiently and that develops execution plans that are optimized for efficient execution. (The term query as used herein refers to a database statement that conforms to database language, such as SQL, and includes database statements that specify operations to modify data.) Query optimizers focus on determining efficient join orders and choosing optimal access methods, but largely disregard optimization of complex numerical formulas written in spreadsheet extensions. Unfortunately, a query that contains formulas can contain many of them. Because query optimizers ignore formulas, a query that contains them is evaluated much less efficiently than it could be.

Based on the foregoing, there is clearly a need for techniques that optimize queries that contain spreadsheet extensions.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows pseudo-code describing a procedure used for ordering the execution of formulas in order to minimize scanning according to an embodiment of the present invention.

FIG. 3 shows pseudo-code describing a procedure used for pruning formulas according to an embodiment of the present invention.

FIGS. 4A and 4B show a flow chart for procedures used to determine whether a predicate may be pushed down into a spreadsheet clause requiring an UPSERT operation.

FIG. 6 shows pseudo-code describing a procedure used for evaluating acyclic formulas.

DETAILED DESCRIPTION OF THE INVENTION

Figure 2:
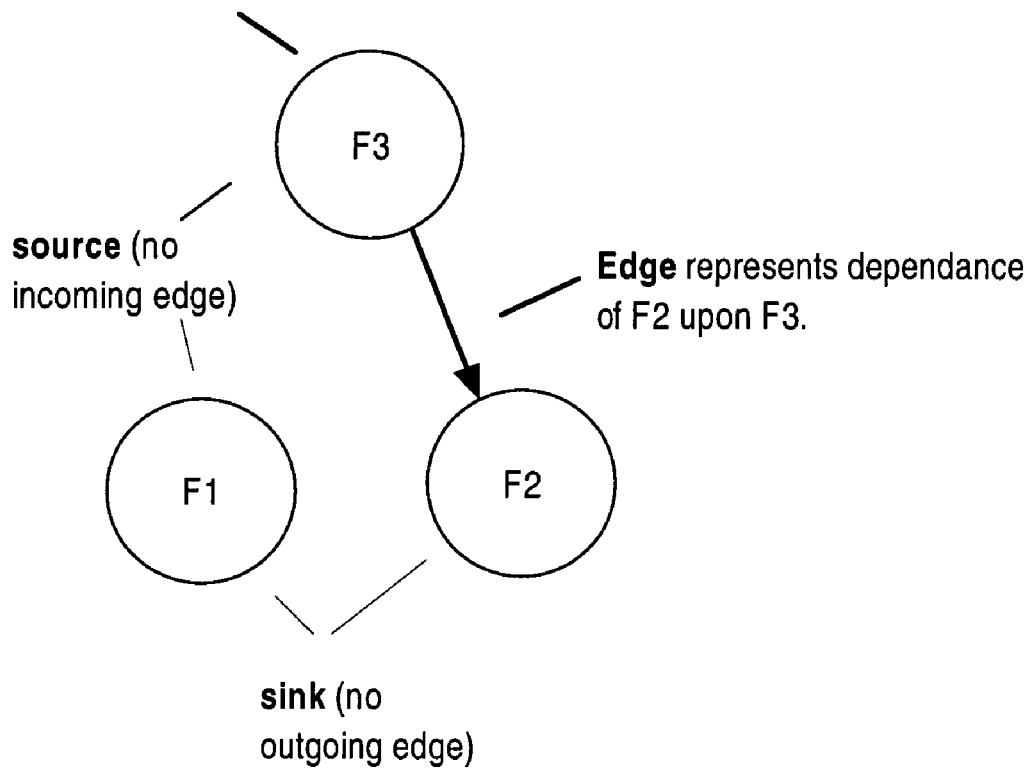
FIG. 2 is a diagram depicting a node graph that represents dependency between formulas according to an embodiment of the present invention.

A method and apparatus for optimizing the evaluation of spreadsheet queries is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Under the spreadsheet extensions for n-dimensional arrays, relations can be viewed as n-dimensional arrays, and a formula can be defined over their cells. Cell addressing can be symbolic using dimensional keys or it can be positional. Similar to spreadsheets, the formulas can automatically be ordered based on the dependencies between the cells; recursive references and convergence conditions are supported, providing for a recursive execution model. OLAP ("Online Analytical Processing") applications frequently fill gaps in sparse data, an operation called densification which is difficult in ANSI SQL, but natural in the proposed SQL-spreadsheet. Formulas are encapsulated in a new SQL query clause that supports partitioning of the data. This allows evaluation of formulas independently for each partition providing a natural parallelization of execution. Formulas support UPSERT and UPDATE semantics as well as correlation between their left and right side. This allows simulation of the effect of multiple joins and UNIONs using a single access structure.

Described herein are optimizations and execution strategies for the spreadsheet extensions. The partitioning of data, as specified in a spreadsheet clause, provides a way to parallelize the computation of spreadsheet and to provide and improve scalability. Even if the partitioning is not explicitly specified in the spreadsheet clause, the database optimizer can automatically infer the partitioning in some cases. Efficient hash based access structures on relations can be used for symbolic array addressing, enabling fast computation of formulas. When rewriting SQL statements, formulas whose results are not referenced in outer blocks can be removed from the spreadsheet clause, thus removing unnecessary computations. The predicates from other query blocks can be moved inside query blocks with spreadsheets clauses, thus considerably reducing the amount of data to be processed. Conditions for validity of this transformation are given.

The following description paper is organized as follows. Section I provides SQL extensions for spreadsheets. Section II provides motivating examples and comparisons to equivalent processing in SQL and MOLAP engines. Section III describes analysis of the spreadsheet clause and query optimizations with spreadsheets. Section IV discusses execution models.

I. SQL Extensions for Spreadsheets

Notation. The following examples use a fact table f(t, r, p, s, c) representing a data-warehouse of electronic products with three dimensions: time (t), region (r), and product (p), and two measures: sales (s) and cost (c).

Spreadsheet clause. OLAP applications divide relational attributes into dimensions and measures. To model that the new spreadsheet clause is used. It identifies, within the query result, PARTITION BY, DIMENSION BY and MEASURES columns. The PARTITION BY columns divide the relation into disjoint subsets. The DIMENSION BY columns uniquely identify a row within each partition, which we call a cell, and serve as an index to the MEASURES columns. The value of measure in a cell may be referred to herein as the value of the cell. The MEASURES columns identify expressions computed by the spreadsheet. Following this, there is a sequence of formulas, each describing a computation on cells. For conciseness, the abbreviations PBY, DBY, and MEA are used herein in lieu of the terms PARTITION BY, DIMENSION BY, and MEASURES. Thus, the structure of the spreadsheet clause is:

```
<SQL query block constructs>
SPREADSHEET PBY (cols) DBY (cols) MEA (cols)
<processing options>
(
    <formula>, <formula>,..., <formula>
)
```

The spreadsheet clause is evaluated after joins, aggregations, window functions, but before final projection and the ORDER BY clause. The clause PBY (cols) specifies the PBY columns, the clause DBY (cols) specify the DBY columns, and the clause MEA (cols) specifies the measure columns.

In an alternate syntax for the spreadsheet clause, the keyword MODEL is used in lieu of the keyword SPREADSHEET. In this syntax, the spreadsheet clause has the following structure:

```
<SQL query block constructs>
MODEL PBY (cols) DBY (cols) MEA (cols)
<processing options>
(
    <formula>, <formula>,..., <formula>
)
```

Cells are referenced using a familiar array notation. Cell references can designate a single cell reference when dimensions are uniquely qualified e.g., s[p='dvd', t=2002], or set of cells called a range reference e.g. s[p='dvd', t<2002] where dimensions are qualified by predicates.

Each formula represents an assignment and contains a left side that designates target cells and a right side that contains expressions involving cells or ranges of cells within the partition. For example:

```
SELECT r, p, t, s
FROM f
SPREADSHEET PBY(r) DBY (p, t) MEA (s)
(
    s[p='dvd',t=2002] = s[p='dvd',t=2001]*1.6,
    s[p='vcr',t=2002] = s[p='vcr',t=2000]
                     + s[p='vcr',t=2001],
    s[p='tv', t=2002] =avg(s)[p='tv',1992<t<2002]
)
``` partitions table f by region r and defines that within each region, sales of 'dvd' in 2002 will be 60% higher than in 2001, sales of 'vcr' in 2002 will be the sum of sales in 2000 and 2001, and sales of 'tv' will be the average of years between 1992 and 2002. As a shorthand, a positional notation exists, for example: s['dvd', 2002] instead of s[p='dvd', t=2002]. Evaluating a formula refers to the operations that are performed to compute the expressions on the right side and assigning the results of the computation to the target cells.

The left side of a formula defines calculations which can span a range of cells. A new function currentv( ) (referred to as cv( ) which stands for current value) carries the value of a dimension from the left side to the right side thus effectively serving as a join between the right and left side. The * operator denotes all values in the dimension. For example:

```
SPREADSHEET DBY (r, p, t) MEA (s)
(
    s['west',*,t>2001]=
        1.2*s[cv(r),cv(p),t=cv(t)-1]
)
``` states that sales of every product in 'west' region for all years >2001 will be 20% higher than sales of the same product in the preceding year. Observe that region and product dimensions on the right side reference function cv( ) to carry dimension values from the left to the right side.

Formulas may specify a range of cells to be updated. A formula referring to multiple cells on the left side is called an existential formula. For existential formulas, the result may be order dependent. For example the intention of

```
SPREADSHEET PBY(r) DBY (p, t) MEA (s)
(
    s['vcr',t<2002]=
        avg(s)['vcr',cv(t)-2<=t<cv(t)]
)
``` is that the sales of 'vcr' for all years before 2002 is an average of two preceding years. Processing rows in ascending and descending order w.r.t dimension t produces different results because measure s is both updated and referenced. Such cases are detected by the compiler [Section III] and executed using a cyclic procedure [Section IV]. To avoid ambiguity, the user can specify an order in which the rule should be evaluated:

```
SPREADSHEET PBY(r) DBY (p, t) MEA (s)
(
    s['vcr', t<2002] ORDER BY t ASC =
        avg(s)[cv(p),   cv(t)-2<=t<cv(t)]
)
```

An innovative feature of a SQL spreadsheet is creation of new rows in the result set. Any formula, with a single cell reference on left side, can operate either in UPDATE or UPSERT (default) mode. The latter creates new cells within a partition if they do not exist, otherwise it updates them. UPDATE ignores nonexistent cells. For example,

```
SPREADSHEET PBY(r) DBY (p, t) MEA (s)
(
    UPSERT s['tv', 2000] =
        s['black-tv',2000] + s['white-tv',2000]
)
``` will create for each region a row with p='tv' and t=2000 if this cell is not present in the input stream. An existential formula defines a range of dimension values on left side. Upsert mode is not allowed with an existential formula because a range of dimension values may belong to a continuous domain and it is not always possible to find out the individual set of values.

Reference Spreadsheets. OLAP applications frequently deal, in a single query, with objects of different dimensionality. For example, the sales table may have region(r), product (p), and time(t) dimensions, while the budget allocation table has only the region(r) dimension. To account for that, a query block can have, in addition to the main spreadsheet, multiple, read-only reference spreadsheets which are n-dimensional arrays defined over other query blocks. Reference spreadsheets, akin to main spreadsheets, have DBY and MEA clauses indicating their dimensions and measures respectively. For example, assume a budget table budget(r,p) containing predictions p for sales increase for each region r. The following query predicts sales in 2002 in region 'west' scaling them using prediction p from the budget table.

```
SELECT r, t, s
FROM f GROUP by r, t
SPREADSHEET
    REFERENCE budget ON (SELECT r, p FROM budget)
        DBY(r) MEA(p)
```

-continued

```
DBY (r, t) MEA (s)
(
    s['west',2002]= p['west']*s['west',2001],
    s['east',2002]= s['east',2001]+s['east',2000]
)
```

The purpose of a reference spreadsheet is similar to a relational join, but it allows us to perform, within a spreadsheet clause, multiple joins using the same access structures (e.g., hash table—see Section IV), thus self-joins within spreadsheet can be cheaper than doing it outside of spreadsheet computation.

Ordering The Evaluation Of Formulas. By default, the evaluation of formulas occurs in the order the formulas are specified, and this order of evaluation is referred to as the SEQUENTIAL ORDER. For example in:

```
SPREADSHEET PBY(r) DBY (p, t) MEA (s)
(
    s['dvd',2002] = s['dvd',2000] + s['dvd',2001]
    s['vcr',2002] = s['vcr',2000] + s['vcr',2001])
)
``` the first formula is evaluated before the last formula. However, there are scenarios in which formulas need to be ordered automatically based on their dependencies. A processing option provided for such scenarios is AUTOMATIC ORDER. For example,

```
SPREADSHEET PBY(r) DBY (p, t) MEA (s)
AUTOMATIC ORDER
(
    s['dvd',2002] = s['dvd',2000] + s['dvd',2001]
    s['dvd',2001] = 1000
)
``` the first formula depends on the second and consequently the latter is evaluated first.

Cycles and Recursive Models. Similarly to existing spreadsheets, spreadsheet computations may contain cycles, as in the formula:

$$s[1]=s[1]/2$$

Consequently, processing options are provided to specify the number of iterations or the convergence criteria for cycles and recursion. The ITERATE (n) option requests iteration of the formulas 'n' times. The optional UNTIL condition will stop the iteration when the <condition> has been met upto a maximum of "n" iterations as specified by ITERATE(n). The <condition> can reference cells before and after the iteration facilitating definition of convergence conditions. A helper function previous (<cell>) returns the value of <cell> at the start of each iteration. For example,

```
SPREADSHEET DBY (x) MEA (s)
    ITERATE (10) UNTIL (PREVIOUS(s[1])-s[1] <= 1)
    ( s[1] = s[1]/2 )
``` will execute the formula s[1]=s[1]/2 until the convergence condition is met, up to a maximum of 10 iterations (in this case if initially s[1] is greater than or equal to 1024, evaluation of the formulas will stop after 10 iterations).

Spreadsheet Processing Options and Miscellaneous functions. There are other processing options for the SQL spreadsheet in addition to the ones for ordering of formulas and termination of cycles. For example, we can specify UPDATE/UPSERT options as default for the entire spreadsheet. The option IGNORE NAV allows us to treat NULL values in numeric calculations as 0, which is convenient for newly inserted cells with the UPSERT option.

II. Illustrative Spreadsheet Usage

Here is an example demonstrating the expressive power of the SQL spreadsheet extensions and its potential for efficient computation as compared to the alternative available in ANSI SQL.

An analyst predicts sales for the year 2002. Based on business trends, sales of 'tv' in 2002 is their sales in 2001 scaled by the average increase between 1992 and 2001. Sales of 'vcr' is the sum of their sales in 2000 and 2001. Sales of 'dvd' is the average of the three previous years. Finally, the analyst wants to introduce in every region a new dimension member 'video' for the year 2002, defined as sales of 'tv' plus sales of 'vcr'. Assuming that rows for 'tv', 'dvd', 'vcr' for year 2002 already exist, the analyst's query can be expressed as:

```
SELECT r, p, t, s
FROM f
SPREADSHEET PBY(r) DBY (p, t) MEA (s)
(
   F1:  UPDATE s['tv',2002] =
          regr_slope(s,t)['tv',1992<=t<=2001]*s['tv',2001]
          + s['tv',2001]
   F2:  UPDATE s['vcr', 2002] =
          s['vcr', 2000] + s['vcr', 2001],
   F3:  UPDATE s['dvd',2002] =
          (s['dvd',1999]+s['dvd',2000]+s['dvd',2001])/3,
   F4:  UPSERT s['video', 2002] =
          s['tv',2002] + s['vcr',2002]
)
```

The regr_slope( ) aggregate is an ANSI SQL function that denotes linear regression slope. To express the above query in ANSI SQL, formula F1 would require an aggregate subquery plus a join to the fact table f, formula F2 a double self-join of the fact table, formula F3 a triple self join of the fact table, and formula F4 a union operation. Such a query would not only be difficult to generate but would also result in an inefficient execution as compared to the query with spreadsheet. The latter needs to scan data only once to generate a point addressable access structure like hash table or an index. If we can deduce from database constraints that t is from an integer domain, then formula F1 is first transformed into:

```
F1: UPDATE s['tv',2002] =
      regr_slope(s,t)['tv',t in (1992,..,2001)]*s['tv',2001]
      + s['tv',2001]
```

This way, the access structure can be used for random, multiple accesses along the time dimension as opposed to a scan to find out the rows satisfying the predicate. Formulas F2, F3, and F4 can use the structure directly. The structure is then used multiple times giving a performance advantage over multiple joins required by equivalent ANSI SQL. In real applications, spreadsheet clauses can contain hundreds of formulas and consequently building a single point access structure in place of hundreds of joins provides a significant performance advantage.

As another example consider the "densification" of a dimension d—a process which assures that all d values are present in the output for every combination of other dimensions. This operation is frequently used in time-series calculations where all time values must be present in the output. This is used for moving averages, prior-period computation, calendar construction, etc. Assume that for each product(p) and region(r) it is desired to ensure that all years present in the dimension table, time_dt, are present in the output. The fact table f is sparse, and may not have all time periods for every product-region pair. Using a spreadsheet this is expressed as:

```
SELECT r, p, t, s
FROM f
SPREADSHEET PBY(r, p) DBY (t) MEA (s, 0 as x)
(
   UPSERT x[FOR t IN (SELECT t FROM time_dt)]= 0
)
```

This partitions the query by (r, p) and within each partition upserts all values from the time dimension. An equivalent formulation using ANSI SQL involves a Cartesian product of f to time_td and a joinback to f a series of operations much less efficient than those required for the above spreadsheet execution:

```
SELECT f.r, f.p, f.t, f.s
FROM f RIGHT OUTER JOIN
      ( (SELECT DISTINCT r, p FROM f)
        CROSS JOIN
        (SELECT t FROM time_dt)
      ) v
   ON (f.r = v.r and f.p = v.p and f.t = v.t)
```

III. Spreadsheet Analysis and Optimization

The spreadsheet analysis determines the order of evaluation of formulas, prunes formulas whose results are fully filtered out by outer queries, restricts the formulas whose results are partially filtered, migrates predicates from outer queries into inner WHERE clause to limit the data processed by the spreadsheet, and generates a filter condition to identify the cells that are required throughout the evaluation of the spreadsheet formulas.

The analysis also determines one of two types of execution methods: one for acyclic and one for (potentially) cyclic formulas. Because of complex predicates in formulas, analysis cannot always ascertain acyclicity of dependency relationships among the formulas in the spreadsheet. Hence, sometimes the cylic execution method is used for acyclic spreadsheets, which is expensive compared to the acyclic method.

Formula dependencies and Execution Order: The order of evaluation of formulas is determined from their dependency graph. Formula $F_1$ depends on $F_2$ (written $F_2 \rightarrow F_1$) if a cell evaluated by $F_2$ is used by $F_1$. For example in:

```
F₁:s['video',2000]=s['tv', 2000]+s['vcr', 2000]
F₂:s['vcr',  2000]=s['vcr',1998]+s['vcr', 1999]
```

$F_2 \rightarrow F_1$ as $F_1$ requires a cell s['vcr',2000] computed by $F_2$. To form the dependency (->) relation, for each formula F the cells that are referenced on its right side R(F) and cells that are modified on its left side L(F) are determined. Obviously, $F_2 \rightarrow F_1$ if f $R(F_1)$ intersects $L(F_2)$. The dependency (->) relation results in a graph with formulas as nodes and their dependency relationship as directed edges. The graph is analyzed for (partial) ordering.

In the presence of complex cell references, like s['tv', $t^2+t^3+t^4<t^5$], it is hard to determine the intersection of predicates. In this case, it is assumed that the formula references all cells. This may result in over-estimation of the dependency (->) relation leading to spurious cycles in the dependency graph.

A spreadsheet formula can access a range of cells (e.g., an aggregate—avg(s)['tv',*] or left side of an existential formula—s[*,*]=10) and thus require a scan of data. If two formulas are independent (unrelated in the partial order derived from the graph), they can be evaluated concurrently using a single scan. To enable concurrent evaluation, formulas are grouped into enumerated levels such that each level contains formulas that have no dependency among them. No formula in the level may depend on a formula in a higher level unless the dependency graph is cyclic.

The path through the partial order with the maximum number of scans represents the minimum number of total scans required for evaluation of the spreadsheet, since they are all related by the partial order. If the graph is an acyclic graph (i.e. a partial order of formulas exists), then the number of levels containing scans can be minimized to this value. The procedure GenLevels shown in FIG. 1 generates the levels such that the number of scans is minimized. Let G(F, E) be the graph of the -> relation where F are formulas and E the -> edges. A formula with no incoming edges is referred to as a source and formulas with only single cell references are referred to as single_refs:

For example:

```
SELECT * FROM f
GROUP BY p, t
SPREADSHEET DBY(p,t) MEA(sum(s) s)
(
    F1: s['tv', 2000] = sum(s)['tv', 1990<t<2000],
    F2: s['vcr',2000] = sum(s)['vcr', 1995<t<2000],
    F3: s['vcr',1999]=s['vcr',1997]+s['vcr',1998]
)
```

FIG. 2 shows spreadsheet graph 201, the spreadsheet graph for the above formula. Spreadsheet graph 201 has one edge: F3->F2. The procedure will assign the point reference F3 to level 1 and the scan F2 to level 2, but will delay assigning the scan F1 until level 2 so that F1 and F2 can share a single scan.

The GenLevels procedure presented simplifies the cyclic case. Before generating the levels, the graph is analyzed for strongly connected components using procedures in [15]. The cyclic subgraphs can then be isolated from acyclic parts of the graph and from other cyclic subgraphs. This is important because the computational complexity of cyclic evaluation is proportional to the total number of rows updated or upserted in a cycle (see auto-acyclic procedure described in Section 5 and FIG. 6). After assigning levels to formulas a cyclic subgraph is dependent on, the cyclic subgraph can be broken by removing formulas from the subgraph and assigning them to individual levels in the same order as the formulas appear in the subgraph until the subgraph is exhausted.

For spreadsheets with sequential order of evaluation, the dependency edges created always point from the earlier formula to the latter formula. A spreadsheet with sequential order can therefore never have a cyclic graph. Still levels are generated in order to group the independent formulas together and hence, minimize the number of scans that are required for computation of aggregates and existential rules in the spreadsheet.

Pruning Formulas: To encapsulate common computations, applications will generate views containing spreadsheets with thousands of formulas. Users querying these views will likely require only a subset of the result, putting predicates over the views. This gives us an opportunity to prune formulas that compute cells discarded by these predicates. For example:

```
SELECT * FROM
(SELECT r, p, t, s FROM f
   SPREADSHEET PBY(r) DBY (p, t) MEA (s) UPDATE
(
F1: s['dvd',2000]=s['dvd', 1999]*1.2,
F2: s['vcr',2000]=s['vcr',1998]+s ['vcr',1999],
F3: s['tv', 2000]=avg(s) ['tv', 1990<t<2000]
) v
)
WHERE p in ('dvd', 'vcr', 'video');
```

The evaluation of the formula F3 is unnecessary as the outer query filters out the cell that F3 evaluates. The above formulas are independent, which makes the pruning process simple. If, however, there is a formula that depends on F3, for example, $F4$: $s$['video', 2000]=$s$['vcr', 2000]+$s$['tv',2000]

then F3 cannot be pruned as it is referenced by F4.

The evaluation of a formula becomes unnecessary when the following conditions are satisfied:

The cells it updates are not used in evaluation of any other formula in the spreadsheet.

The cells updated by the formula are filtered out in the outer query block or the measure updated by the formula is never referenced in the outer query block.

Identification of formulas that can be pruned is done by the procedure PruneFormulas (see FIG. 3) based on the dependency of graph G. A sink is a formula with no outgoing edge, i.e., a formula no other formula depends on.

Rewriting Formulas. Pruning formulas alone is not sufficient to avoid unnecessary computations during spreadsheet evaluation. In some cases, the results computed by a formula may be partially filtered out in the outer query block. Consider the following query which predicts the sale of all products in 2002 to be twice the cost of the same product in 2002, and then selects the sale and cost values for 'dvd' and 'vcr' for years>=2000.

```
SELECT * FROM
(SELECT r, p, t, s FROM f
   SPREADSHEET PBY(r) DBY (p, t) MEA (s,c) UPDATE
(
F1: s[*,2002]=c[cv(p), 2002]*2,
) v
)
WHERE p in ('dvd','vcr') and t >= 2000;
```

The formula F1 cannot be pruned away as part of its result is needed in the outer query block. Still, the s values for all products in 2002 do not need to be computed as the outer query filters out all the rows except for products 'dvd' and 'vcr'. Hence the left side of formula F1 is rewritten as follows to avoid unnecessary computation:

F1': s[p in ('dvd', 'vcr'),2002]=c[cv (p), 2002]*2

The rewriting of formulas is done with a small extension of the procedure PruneFormulas. In the new PruneFormulas, an attempt is made to rewrite the formulas in all sink nodes that cannot be pruned. Note that similar to pruning of a formula, the rewrite of a formula may also change the dependency graph (some incoming edges of the formula might be deleted) possibly leading to generation of new sink nodes, so it is only natural that both rewrite and pruning of formulas are handled in the same process.

Rewriting of formulas that are not sink nodes is also possible but the rewrite in that case is complicated as it is not only based on outer predicates, but also on the reference predicates of the other formulas that depend on the formula being rewritten.

Pushing predicates through spreadsheet clauses. Pushing predicates into an inner query block, and its generalization 'predicate move-around', is an important optimization and has been incorporated into queries with spreadsheets. Three types of pushing optimizations can be performed: pushing on PBY and independent DBY dimensions, pushing based on bounding rectangle analysis and pushing through reference spreadsheets.

Pushing predicates through the PBY expressions in or out of the query block is always correct as they filter entire partitions. For example, in:

```
SELECT * FROM
(SELECT r, p, t, s FROM f
  SPREADSHEET PBY(r) DBY (p, t) MEA (s) UPDATE
  (
    F1:s['dvd',2000]=s['dvd',1999]+s['dvd',1997],
    F2:s['vcr',2000]=s['vcr',1998]+s['vcr',1999]
  )
) v
WHERE r = 'east' and t = 2000 and p = 'dvd';
``` the predicate r='east' is pushed through the spreadsheet clause into the WHERE clause of the inner query.

Pushing can be extended to independent dimensions. A dimension d is called an independent dimension if, for every formula, the value of d referenced on the the right side is the same as the value of d on the left side. For example, in the above spreadsheet, the left side of F1 refers to the same values of p as the right side. The same is true for formula F2 as well, thereby making p an independent dimension. Dimension t, however is not an independent dimension.

In the absence of UPSERT rules, independent dimensions can be functionally equivalent to the partitioning dimensions and may be moved from the DBY to the PBY clause. An independent dimension (d) can be moved from DBY to PBY clause when:

(1) all formulas in the spreadsheet qualify all values for that dimension (e.g. via *) on their left side;
(2) all formulas in the spreadsheet have only cv(d) references for that dimension on their right side;
(3) no formula has nested cell referencing or cross referencing to cv(d);
(4) no formula has a reference spreadsheet cell referencing cv(d) on its right side; and
(5) spreadsheet iterate condition (if any), has no main spreadsheet cell references (reference spreadsheet cell references are okay).

For example, in the above spreadsheet, replace PBY/DBY clauses can be replaced with SPREADSHEET PBY(r, p) DBY (t) MEA (s) UPDATE Consequently, predicate p='dvd' can pushed into the inner query.

Predicates on PBY and independent DBY expressions are pulled out of the query to effect predicate move-around described in [11].

The outer predicates on the DBY expressions which are not independent can also be pushed in but require extending them so that they do not filter out the cells referenced by the right sides of the formulas. For each formula, a predicate defining the rectangle bounding the referenced cells is constructed. For example for F2 these predicates are p='vcr' and t in (1998, 1999) and for F1 p='dvd' and t in (1997, 1999). Then a bounding rectangle for the entire spreadsheet is obtained using methods described in [8] and [3], which is a union of bounding rectangles for each formula, which in this case is p in ('vcr', 'dvd') and t in (1997, 1998, 1999). Then the predicates on DBY columns from the outer query are extended with the corresponding predicates from the spreadsheet bounding rectangle, and these are pushed into the query. In this example, the outer predicate t=2000 is extended with t in (1997, 1998, 1999) which results in pushing t in (1997, 1998, 1999, 2000). The predicates on DBY expressions in the outer query block are kept in place unless the pushdown filter is the same as the outer filter and there are no upsert formulas in the spreadsheet.

A challenging scenario arises when the bounding rectangle for a formula cannot be determined at optimization time since it may depend on a subquery S whose bounds are known only after S's execution. This is common in OLAP queries which frequently inquire about the relationship of a measure at a child level to that of its parent (e.g., sales of a state as a percentage of sales of a country), or inquire about a prior value of a measure (e.g., sales in March-2002 vs. sales the same month a year ago or a quarter ago). These relationships are obtained by querying dimension tables. For example, assume that the primary key of time dimension time_dt is month m and the table time_dt stores the corresponding month a year ago as m_yago, and the corresponding month a quarter ago as m_qago. Quarter ago of 1999-01 is 1998-10 (see Table 1)

TABLE 1

| Mapping between m and m_yago/m_qago | | |
|---|---|---|
| m | m_yago | m_qago |
| 1999-01 | 1998-01 | 1998-10 |
| 1999-02 | 1998-02 | 1998-11 |
| 1999-03 | 1998-03 | 1998-12 |

An analyst wants to compute for a product 'dvd' and months ('1999-01', '1999-03') the ratio of that month's sales to the sales in corresponding months a year and quarter ago respectively (r_yago and r_qago). Using an SQL spreadsheet, this query is:

```
S1
    SELECT p, m, s, r_yago, r_qago FROM
        (SELECT p, m, s FROM f GROUP BY p, m
        SPREADSHEET
            REFERENCE prior ON
                (SELECT m, m_yago, m_qago FROM time_dt)
                DBY(m) MEA(m_yago, m_qago)
            PBY(p) DBY (m) MEA (sum(s) s,r_yago,r_qago)
            (
            F1: r_yago[*] = s[cv(m)] / s[m_yago[cv(m)]],
            F2: r_qago[*] = s[cv(m)] / s[m_qago[cv(m)]]
            ) v
        )
        WHERE p = 'dvd' and m IN ('1999–01', '1999–03');
```

The reference spreadsheet in this case serves as a one-dimensional look-up table translating month m into the corresponding month a year ago m_yago and a quarter ago m_qago. An alternative formulation of the query using ANSI SQL requires the joins f><time_dt><f><f, where the first join gives the month values a year and a quarter ago for each row in a fact table and the other two joins given the sales values in the same month, a quarter ago and a year ago respectively. Thus, using a reference spreadsheet, the number of joins is reduced to one.

The predicate p='dvd' on the PBY column can be pushed into the inner block. However, m is neither an independent dimension nor can bounding rectangles be determined for it as the values m_yago and m_qago are unknown. Consequently, a restriction on m cannot be pushed-in resulting in all time periods pumped to the spreadsheet out of which all except 1999-01 and 1999-03 are subsequently discarded in the outer query. Call dimension d a functionally independent dimension if for every formula, the value of d referenced on the right side is either the same as the value of d on the left side or a function of the value of d on the left side via a reference spreadsheet. In query, m is a functionally independent dimension, as the right side uses m directly or uses a function of the value of m on the left side: m_yago[cv(m)] and m_qago[cv(m)].

Three types of transformations may be used to push predicates through functionally independent dimensions. In the first type of transformation, called ref-subquery pushing, transformation added into the inner block a subquery predicate which selects all values needed by the spreadsheet and the outer query. The transformation is similar to the magic set transformation which pushes a query derived from outer predicates into the inner block. In the above case, the outer query needs m IN ('1999-01', '1999-03') (i.e. the outer query requires the values in m that satisfy the predicate m IN ('1999-01', '1999-03')), and the spreadsheet needs these values plus their corresponding m_yago and m_qago values from the reference spreadsheet. These values can be obtained by constructing a subquery named S2 over the reference spreadsheet:

```
S2
    WITH ref_subquery AS
        (SELECT m, m_yago, m_qago FROM time_dt
         WHERE m IN ('1999–01', '1999–03'))
        SELECT m AS m_value FROM ref_subquery
        UNION
        SELECT m_yago AS m_value FROM ref_subquery
        UNION
        SELECT m_qago AS m_value FROM ref_subquery
``` and then pushing it into the inner block of the query:
```
SELECT p, m, s, r_yago, r_qago FROM
    (SELECT p, m, s FROM f
        WHERE m IN (SELECT m_value FROM S1)
        GROUP BY p, m
        SPREADSHEET
        <.. as above in query S1 .. >
    )
    WHERE p = 'dvd' and m IN ('1999–01', '1999–03');
```

In the second type of transformation, called extended pushing, pushed-in predicates are constructed by executing the reference spreadsheet query, obtaining the referenced values and building predicates on the dimension, and finally disjuncting them with the outer predicates. In the above case the following is executed

```
SELECT DISTINCT m_yago, m_qago FROM time_dt
    WHERE m IN ('1999–01', '1999–03')
``` to obtain the values for m_yago and m_qago corresponding to m IN ('1999-01', '1999-03').

Let's assume that the corresponding m_yago is ('1998-01', '1998-03') and m_qago is ('1998-10', '1998-12') i.e., the first and third month of the previous quarter. Finally the predicate is pushed into the inner query:

```
SELECT p, m, s, r_yago, r_qago FROM
    (SELECT p, m, s FROM f
        WHERE m IN ('1999–01', '1999–03', /* outer preds */
                    '1998–01', '1998–03', /* prev year */
                    '1998–10', '1998–12') /* prev quart */
        GROUP BY p, m
        SPREADSHEET
        <.. as above in query .. >
    )
    WHERE p = 'dvd' and m IN ('1999–01', '1999–03');
```

In the third type of transformation, called formula unfolding, formulas are transformed by replacing the reference spreadsheet with its values. Similarly to the second transformation, the reference spreadsheet is executed to obtain its measure for each of the dimension values requested by the outer query. These values are then used to unfold the formulas. For example, for m='1999-01', value of m_yago='1998-01', and m_qago='1998-10', and for m='1999-03', value of m_yago='1998-03', and m_qago='1998-12'. Thus formulas are unfolded as:

```
SELECT p, m, s, r_yago, r_qago FROM
    (SELECT p, m, s FROM f GROUP BY p, m
    SPREADSHEET
        REFERENCE prior ON
            (SELECT m, m_yago, m_qago FROM time_dt)
            DBY(m) MEA(m_yago, m_qago)
        PBY(p) DBY (m) MEA (sum(s) s,r_yago,r_qago)
        (
        F1:  r_yago['1999–01'] = s['1999–01'] / s['1998–01'],
        F1': r_yago['1999–03'] = s['1999–03'] / s['1998–03'],
        F2:  r_qago['1999–01'] = s['1999–01'] / s['1998–10'],
        F2': r_qago['1999–03'] = s['1999–01'] / s['1998–12']
        ) v
    )
    WHERE p = 'dvd' and m IN ('1999–01', '1999–03');
```

Following formula flattening, an analysis is performed of the bounding rectangles described above and the resulting bounding predicate is pushed into the inner query.

Pushdown of dimension predicates in the presence of Upsert rules for a spreadsheet with PBY clause. When a spreadsheet clause has a PBY clause and upsert rules, pushing predicates based on bounding rectangle analysis can be done under certain conditions. There is a possibility that the pushed filter eliminates an entire partition and upsert of new cells for that partition never take place, leaving rows missing in the result of the query block that has the spreadsheet. The following query illustrates this possibility.

```
SELECT r,p,t,s
    FROM
        (SELECT r,p,t,s FROM t
        SPREADSHEET PBY(r) DBY(p,t) MEA(s)
        UPSERT
        (
            s['dvd',2003] = 0
        ))
    WHERE p IN ('dvd', 'vcr');
```

Based on minimum bounding rectangle analysis, the predicate (p IN ('dvd', 'vcr')) is a candidate for pushing down. Now assume that there is a region ('region_x') where there are no dvd or vcr sales. If the predicate is pushed down, the entire 'region_x' is filtered out and the new row (r='region_x', p='dvd', t=2003, s=0) would not be upserted, and subsequently, would not be in the final result. Note that this row will appear in the result if the pushdown on predicate (p IN ('dvd', 'vcr')) is not done.

Predicate pushdown (based on minimum bounding rectangle analysis) through spreadsheets with a PBY clause and upsert rules can be performed under certain conditions. Recall that the pushdown predicate generated based on minimum bounding rectangle analysis covers all values referenced on the right side of rules and the ones that are selected in the filter of the outer query block. If the pushdown predicate can eliminate an entire partition, then only the cells that are upserted by the spreadsheet would be returned to the outer query block for that partition. If one can determine that the upserted cells for an empty partition are guaranteed to be filtered out, than it does not matter whether the rows for a partition are filtered out before or after spreadsheet computation. In that case, predicate pushdown on DBY columns can be done.

For example, consider the following query:

```
SELECT r,p,t,s
    FROM
        (SELECT r,p,t,s FROM t
        SPREADSHEEt PBY(r) DBY(p,t) MEA(s)
        UPSERT
        (
            s['dvd',2003] = s['tv',2003]*0.5
        ))
    WHERE p IN ('dvd', 'vcr') and (s IS NOT NULL);
```

The pushdown predicate for p is (p in ('dvd', 'vcr', 'tv')). Now consider the region 'region_x', which does not have any tv or vcr or dvd sales. For 'region_x', s['tv', 2003] is NULL as it does not exist. So the spreadsheet upserts the row (r='region_x', p='dvd', t=2003, s=NULL) for partition 'region_x'. The row is filtered out by the outer predicate (s is NOT NULL). The partition 'region_x' is guaranteed to be eliminated from the result. In this case, the predicate on p can be pushed down.

The determination of whether it is correct to perform a predicate pushdown for dimensions through upserts is based on two analyses:

(1) an analysis of the rules to determine which upserted measures can be NULL, and (2) a further analysis of the outer filter to determine if null values of these measures are filtered out by, for example, using a NOT NULL predicate.

In the example above, none of the cells referenced on the right side (in this case s['tv', 2003]) exist, and the s values for the upserted cells would all be NULL. Examination of the outer filter reveals that cells with NULL values for s are filtered out. So elimination of entire partitions by the pushdown filters would not change the final result, so predicate pushdown can be done.

Note that the use of the IGNORE NAV option directly turns off predicate pushdown for dimensions in the presence of upsert rules and the PBY clause, as this option causes NULLs to be ignored in rule computations, i.e., in arithmetic expressions NULLs are considered to be 0 values.

A determination of whether it is correct to perform a predicate pushdown for dimensions through upserts can be performed using the procedures FindNullableMeasure, shown in FIG. 4A, and NullableMeasFiltered, shown in FIG. 4B. FindNullableMeasure performs an analyses of the rules to determine which upserted measures can be NULL.

NullableMeasFiltered performs a further analysis of the outer filter to determine if null values of these measures are filtered out by, for example, using a NOT NULL predicate. The procedure analyzes the outer filter and returns TRUE if pushdown of dimension filters may be performed, FALSE otherwise. For step 4, for measure m, the predicate (m is NOT NULL) implies that m cannot be NULL, the predicate (m>0) implies that m cannot be NULL (since NULL value for m would not satisfy this), and the predicate (a>0) does not imply anything for m.

Evaluation of aggregates using window function style computation. Consider the following spreadsheet query:

```
SELECT r,p,t,s, ps FROM t
    SPREADSHEET PBY(r) DBY(p,t) MEA(s, t as tm, 0 as ps)
    UPSERT
    (
        ps[*,*] = s[cv(p), cv(t) −1] * (1+regr_slope(s,tm)
                [cv(p), t BETWEEN cv(t)−1 and cv(t)−5])
    );
```

This query computes the projected sales of each product for every year to compare it with the actual sales figure. The projected sales amount for a year is computed by multiplying the actual sales amount from the previous year with 1 plus the regression_slope for the actual sales values for the 5 previous years.

Without optimization, this query requires an expensive computation. The right side of the rule is computed for each cell updated on the left side. The right side has an aggregate function, which requires a full table scan of table t. Hence, a full scan is performed for all the cells updated by the rule. In the above query, there are as many full table scans as rows in the table t. The query can be optimized by reducing the number of table scans.

The number of table scans can be reduced if it can be determined that aggregates on the right side of an existential rule can be evaluated using a sort in window function style instead of performing a scan per cell to update. Window functions are described in detail in U.S. patent application Ser. No. 09/656,905, entitled Method For Minimizing the Number of Sorts Required for a Query Block Containing Window Functions, filed on Sep. 7, 2000 by Abhinav Gupta and issued as U.S. Pat. No. 6,389,410, the contents of which are incorporated herein by reference.

For the example above, a single sort of the data is performed and the aggregates evaluated over the result of the sort using a single table scan. Specifically, the aggregate on the right side of the rule regr_slope(s, tm)[cv(p), t between cv(t)-1 and cv(t)-5] can be rewritten using window function style as regr_slope(s, tm) over (PARTITION BY p ORDER BY t RANGE between 5 preceding and 1 preceding)

This function performs just one sort and then a single table scan.

A query can be rewritten using window function style computation when (1) the left side and the right side of each formula in the spreadsheet clause does not depend on each other, i.e., the formula is not self cyclic, and (2) all aggregates on the right side of the formula can be evaluated in window function style computation.

The formulas with window function style computation are assigned to the same execution level if they can be evaluated using the same sort. Rewriting queries to use these window functions triggers existing optimizations performed for queries with window functions. Such optimizations involve grouping window functions into groups which can be satisfied with the same sort. This is done for spreadsheet rules which have been rewritten using window functions as well.

IV SQL Spreadsheet Execution

Access structures. For efficient access to single cells (like s[p='dvd', t=2000]), a two-level hash access structure is built. In the first level, data is hash partitioned on the PBY columns, and in the second level, a hash table is built on the PBY and DBY columns within each first level partition. The formulas are evaluated for one spreadsheet partition at a time. A spreadsheet partition contains all rows with the same PBY column values. Hence, one spreadsheet partition lies completely within one first level hash partition of the access structure. Therefore, if the second level hash tables of each of the first level partitions fit in memory, spilling to disk for evaluating the formulas is altogether avoided. To further minimize size and build time of hash tables, the access structure is built only on rows required by the formulas as defined by the spreadsheet filter obtained by bounding rectangle analysis (see Section III).

The hash access structure supports operations like probe, update, upsert, insert and scan of all records within a spreadsheet partition. The hash access structure maintains records within a hash bucket clustered on PBY and DBY column values, thereby making the scan and probe on a spreadsheet partition efficient.

The number of first level partitions is chosen based on estimated size of data to be inserted into the access structure and the amount of available memory. The goal is to fit second level hash tables for each first level partition in memory. However, the spreadsheet partitions may be really big and there may not be enough memory to fit a partition. In such cases, a disk based hash table is built, and both a weighted LRU scheme for block replacement and pointer swizzling to make references lightweight is employed.

Figure 5:
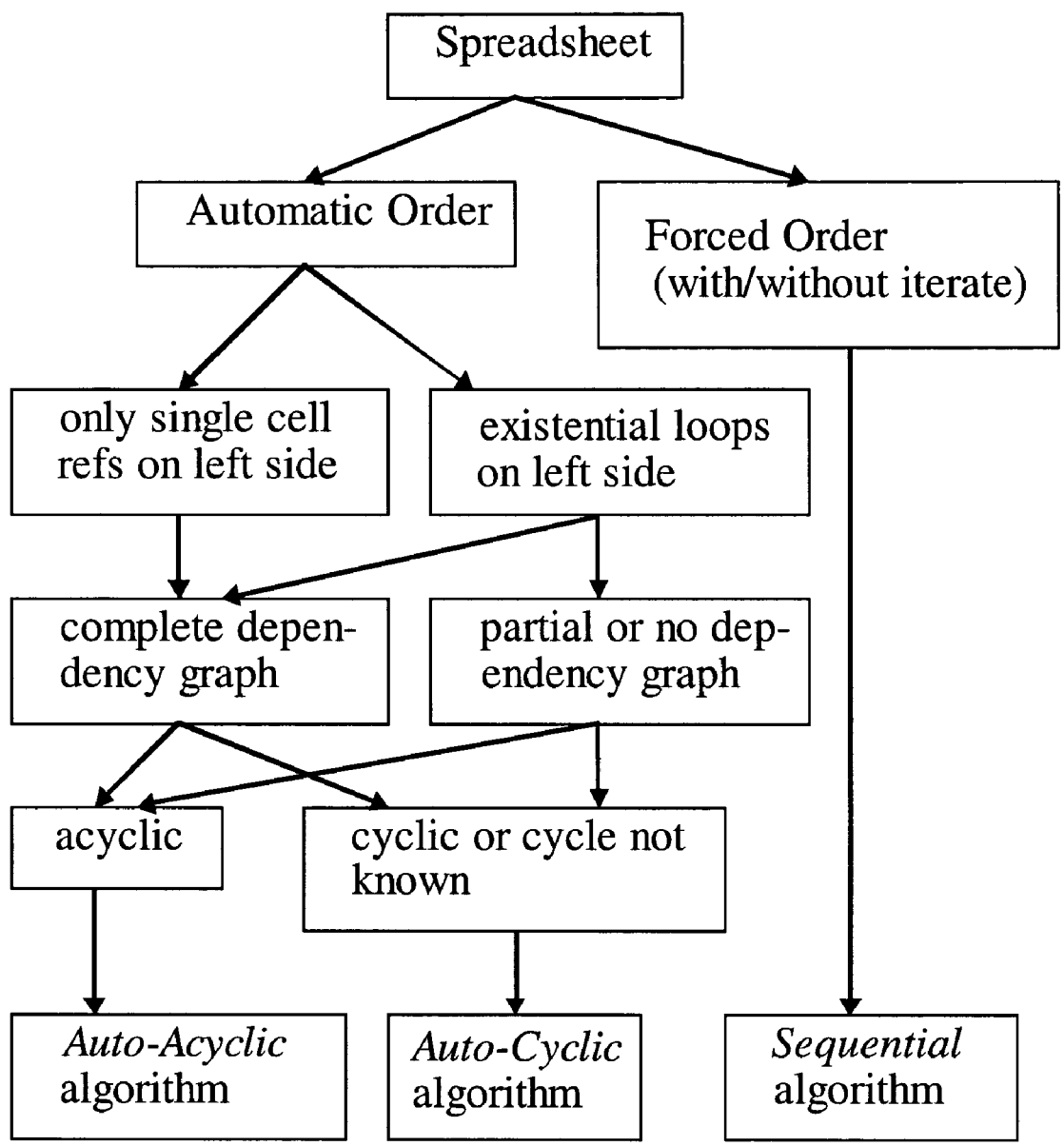
FIG. 5 is a diagram showing a classification of spreadsheets based on the evaluation order and dependency analysis and identifies the execution procedure for the classes of spreadsheets.

Execution. Formulas in a SQL spreadsheet operate in automatic order or sequential order. FIG. 5 shows classification of spreadsheets based on the evaluation order and dependency analysis and identifies the execution procedure for the classes of spreadsheets. There are three procedures: Auto-Acyclic, Auto-Cyclic & Sequential.

Automatic Order. The order of evaluation of formulas in an automatic order spreadsheet is given by their dependencies (see Section III). There are two types of procedures for its execution.

The Auto-Acyclic procedure (see FIG. 6) is taken when a complete and accurate dependency graph can be built and no cycles are detected in the dependency graph.

Notice that all the aggregates at any level are computed before evaluation of formulas at that level so they are available for the formulas. This requires a scan of records in the partition for each level. In the absence of existential formulas, and presence of only those aggregate functions for which an inverse is defined (for example, SUM, COUNT etc.), the aggregates for all the levels are computed in a single scan. And, with each formula the procedure stores a list of aggregates dependent on the cell being upserted (or updated) by it. It is possible to determine such a list because there are only single cell references on the left side. So, if a formula changes the value of a measure, the corresponding dependent aggregates are updated by applying the current value and inverse of the old value of the measure. In the above algorithm (containing scans I, II and III as shown in FIG. 6), we can combine scan (I) with scan (II) or scan (III).

An example of an acyclic spreadsheet:

```
SELECT r, p, t, s
FROM f
SPREADSHEET PBY(r) DBY (p, t) MEA (s)
(
    s['tv', 2002]   =s['tv', 2001] * 1.1,
    s['vcr',2002]  =s['vcr', 1998] + s['vcr', 1999],
    s['dvd',2002]  =(s['dvd', 1997]+s['dvd',1998])/2,
    s[*,    2003]  =s[cv(p), 2002] * 1.2
)
```

The above query makes sales forecasts for years 2002 and 2003. The formulas are split into 2 levels. The first level consists of the first 3 formulas, projecting sales for 2002, and the second level, dependent on the first level, consists of the last formula, projecting sales for 2003. The procedure Auto-Acyclic evaluates formulas in the first level before evaluating formulas in the second level.

Auto-Cyclic Procedure. There are also automatic order spreadsheets which are either cyclic, or have complex predicates that make the existence of cycles indeterminate. In such cases (Section III), the dependency analysis approximately groups the formulas into levels by finding sets of formulas comprising strongly connected components (SCCs—the largest union of intersecting cycles), and assigning the formulas in an SCC to consecutive levels. The Auto-Cyclic algorithm evaluates formulas that are not contained in SCCs as in the acyclic case, but when formulas in SCCs are encountered, it iterates over the consecutive SCC formulas until a fixed point is reached, but only upto a maximum of 'N' iterations where N=number of cells upserted (or updated) in the first iteration. If the spreadsheet was actually acyclic, the formulas will converge after at most 'N' iterations. In the worst case, if the formulas were evaluated in exactly the opposite order of (real) dependency, each iteration will propagate one correct value to another formula, hence requiring 'N' iterations. Therefore, to evaluate all acyclic spreadsheets which could not be classified as acyclic and limit the number of iterations for cyclic spreadsheets, the maximum number of iterations for evaluation of formulas is fixed at 'N'. If the spreadsheet does not converge in 'N' iterations, an error is returned to the user. To determine if the spreadsheet has converged after an iteration, a flag is stored with the measure. This flag can be set whenever the measure is referenced while evaluating a formula. Later update of a measure, for which the flag set, to a different value indicates that additional iterations are required to reach a fixed point. Similarly, an insert of a new cell (by an UPSERT formula) signals additional iterations. This technique will require resetting flags for each measure after each iteration—an expensive proposition. Hence, instead of a single flag, two flags are stored, each one being used in alternate iterations—as one of the flags is set, the other one can be cleared.

Sequential Order. In a sequential order spreadsheet, formulas are evaluated in the order they appear in the spreadsheet clause. The dependency analysis still groups the formulas into levels consisting of independent formulas so that the number of scans required for computation of aggregate functions is minimized. The algorithm is similar to Auto-Acyclic, but there may be multiple iterations as specified in the spreadsheet processing option—'ITERATE'.

Parallel Execution of SQL Spreadsheet. The spreadsheet is evaluated scalably by evaluating the formulas over partitions in parallel. The data is distributed to Processing Elements (PE) based on the PBY columns so that each PE can work on partitions independent of other PEs. The distribution of partitions to PEs can be hash or range based on PBY columns. The work of PEs is coordinated by a single process called the query coordinator. For example, the following spreadsheet query can be evaluated by hash partitioning the data on r:

```
SPREADSHEET PBY(r) DBY(p, t) MEA(s)
(
    s['dvd', 2000] = 1.2*s['dvd', 1999]
)
```

In some cases, data partitioning on just the PBY columns limits the degree of parallelization and hence the scalability. That is the case when there are no PBY columns, or PBY columns have very small cardinality as in PBY(gender) where only two partitions ('male' and 'female') exist.

In such cases, in addition to PBY columns, some DBY columns are included for data partitioning. For example, the following query:

```
S2
    SPREADSHEET PBY(r) DBY(p, t) MEA(s) UPDATE
    (
        F1: s[*,2002]=
            avg(s) [cv(p), t in (1998,2000)],
        F2: s[*,2003]=
            avg(s) [cv(p), t in (1999,2001)]
    )
    is changed to
    SPREADSHEET PBY(r, p) DBY(t) MEA(s) UPDATE
    (
        s[2002] = avg(s) [t in (1998, 2000)],
        s[2003] = avg(s) [t in (1999, 2001)]
    )
``` as formulas are independent of the dimension column p. This can be done for any independent dimension—see Section III.

Partitioning on a larger set of columns results in better load balancing and processor utilization as parallelization takes place on both r and p. All PEs execute the same set of formulas but with different data sets. If the column corresponding to an independent dimension on the left side doesn't qualify all values of that dimension, (i.e., in our notation is not a "*"), it will not be possible to promote the independent dimension to PBY. This is because promoting to PBY would incorrectly update all values for that dimension. Instead, the independent dimension in the PBY clause is duplicated as well to get better parallelization. For example:

```
S2
    SPREADSHEET PBY(r) DBY(p, t) MEA(s) UPDATE
    (
        s[p != 'bike',2002]= avg(s) [cv(p), t<2001]
    )
    is rewritten by optimizer for parallelization to:
    SPREADSHEET PBY(r, p) DBY(p, t) MEA(s) UPDATE
    (
        s[p != 'bike',2002]= avg(s) [cv(p),t<2001]
    )
```

Complex scenarios exist where different PEs need to execute different sets of formulas. One such scenario is the presence of UPSERT option as in:

```
SPREADSHEET PBY(r) DBY(p, t) MEA(s) UPSERT
(
    F1: s['dvd',2002] = sum(s) ['dvd', t<1999]
        + avg(s) ['dvd',1999<=t<= 2001],
    F2: s['vcr',2002] = avg(s) ['vcr', t <= 2001],
    F3: s[*, 2003] = 1.2*s[cv(p), 2002]
)
```

In this spreadsheet, p is again an independent dimension. But because of the UPSERT option, using p as a partitioning column with all PEs evaluating the same set of formulas can lead to an incorrect result. Assume that products 'dvd' and 'vcr' get assigned to different PEs: PE1 and PE2 respectively. If the same formulas are executed by both PEs, the result would have spurious rows—for example, PE1 working on product 'dvd' would introduce a row for 'vcr' while this row might already exist in the data set passed to PE2. In such cases, spreadsheet formulas need to be grouped and assigned to PEs based on data distribution so that the formula F is assigned to PE if f PE is processing data which F touches. For example, PE1 might evaluate formulas F1 and F3 while PE2 evaluates formulas F2 and F3.

This process of grouping formulas cannot be done at compile time as it is data dependent. Instead this is done by passing an extra condition to each PE, indicating the data set for which the formulas should be evaluated. In this case, if data is distributed to PEs by HASH partitioning, the extra condition is of the form:

WHERE HASH(p)=hash_value_of_P_for_this_PE.

The value for hash_value_of_P_for_this_PE is passed to each PE by the query coordinator. Then each PE, before evaluating a non-existential formula, i.e., one which explicitly qualifies all dimensions would find the value for p and verify that the triggering condition holds. If so, the formula is executed, otherwise it is skipped. The HASH(p) is the hash function used for data partitioning. For existential formulas the condition does not need to be evaluated as the formulas never generate new rows operating only in the update mode. So in the above spreadsheet assume that HASH('dvd')=1 and HASH('vcr')=2, and PE1 and PE2 operate in hash partitions 1 and 2 correspondingly. Then PE1 evaluates F1 and F3 while PE2 evaluates formulas F2 and F3.

V BIBLIOGRAPHY

The following documents are incorporated herein by reference.

[1] APB Benchmark Specifications. http://www.olapcouncil.org/research/APB1R2_spec.pdf
[2] A. Balmin, T. Papadimitriou, Y. Papakonstantinou. "Hypothetical Queries in an OLAP Environment," In *Proceedings of the 26th VLDB Conference*, Cairo, Egypt, 2000.
[3] N. Beckmann, H. P. Kriegel, R. Schneider, B. Seeger, "The R*-tree: An efficient and Robust Access Method for Points and Rectangles," In *Proc. 1990 ACM SIGMOD Conf.*
[4] R. G. Bello, et al, "Materialized Views In Oracle", *Proceedings of VLDB'98*, New York, USA, 1998
[5] J. A. Blakeley, P. Larson, and F. W. Tompa. "Efficiently Updating Materialized Views," *Proceedings of ACM SIGMOD* 1986
[6] D. Chatziantoniou and K. Ross, "Querying Multiple Features of Groups in Relational Databases," *Proceedings of VLDB'96*.
[7] A. Gupta, I. S. Mumick, and V. S. Subrahmanian. "Maintaining views incrementally". *Proceedings of ACM SIGMOD 1993 International Conference on Management of Data*, Washington D.C., 1993.
[8] A. Guttman, "R-Trees: A Dynamic Index Structure for Spatial Searching," *Proc. 1984 ACM SIGMOD Conf.*
[9] Joseph M. Hellerstein. "Practical predicate placement," *Proceedings of ACM SIGMOD 1994 International Conference on Management of Data*, 1994.
[10] J. M. Hellerstein and M. Stonebraker. "Predicate migration: Optimizing queries with expensive predicates," *Proceedings of ACM SIGMOD 1993*, Washington D.C., 1993.
[11] L. Lakshamanan, J. Pei, Y. Zhao, "QC-Trees. Efficient Summary Structure for Semantic OLAP", *Proceedings of ACM SIGMOD* 2003, San Diego, Calif. 2003.
[12] A. Y. Levy, I. S. Mumick, and Y. Sagiv. "Query optimization by predicate move-around," *Proceedings of the 20th VLDB Conference*, Santiago, Chile, 1994.
[13] K. Ross, D. Srivastava, P. Stuckey, and S. Sudarshan. "Foundations of aggregation constraints," Alan Borning, editor, *Principles and Practice of Constraint Programming*, 1994.
[14] I. S. Mumick, S. Finkelstein, H. Pirahesh, and R. Ramakrishnan. "Magic is relevant," *Proceedings of the ACM SIGMOD* 1990, Atlantic City, N.J., 1990
[15] D. Srivastava and R. Ramakrishnan. "Pushing Constraint Selections," *Proceedings of the Eleventh Symposium on Principles of Database Systems (PODS)*, San Diego, Calif., 1992.
[16] Y. Sismanis, N. Roussopoulos, A. Deligiannakis, Y. Kotidis, "Dwarf: Shrinking the Petacube", *Proceedings of ACM SIGMOD* 2002, Madison, Wis., 2002.
[17] R. Tarjan. "Dept-first search and linear graph algorithms," *SIAM J. Computing*, 1997.
[18] F. Zemke. "Rank, Moving and reporting functions for OLAP," 1999 Jan. 22 *proposal for ANSI-NCTS.*
[19] Andrew Witkowski, Srikanth Bellamkonda, Tolga Bozkaya, Gregory Dorman, Nathan Folkert, Abhinav Gupta, Lei Shen, Sankar Subramanian, "Spreadsheet in RDBMS for OLAP", *Proceedings of ACM SIGMOD* 2003, June 9-12, 200, San Diego, Calif. ACM 1-58113-634-x/03/06

Hardware Overview

Figure 7:
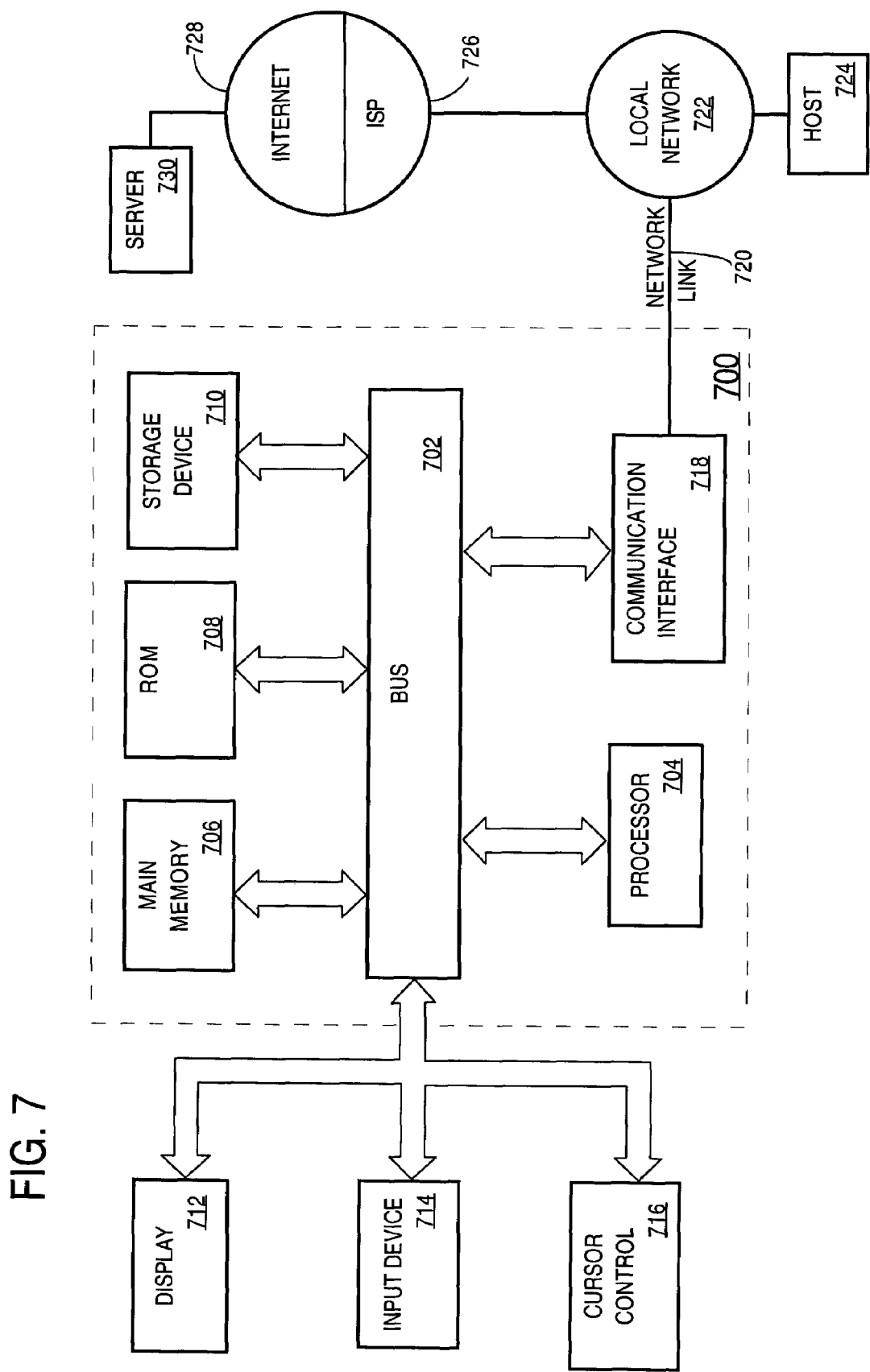
FIG. 7 is a block diagram depicting a computer system which may be used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. For example, the techniques described herein for optimizing queries and their execution are not limited to database statements that conform to ANSI SQL or a proprietary form of SQL, or even to database statements that conform SQL. An embodiment of the present invention may be used with any database statement that conforms to a database language. The specification and drawings are, accordingly, to be regarded in an illustrative rather than a restrictive sense.

What is claimed is:

1. A method for processing a query, the method comprising the computer-implemented steps of:
   examining said query;
   wherein said query evaluates to a relation;
   wherein the query defines an away and a set of formulas that reference the array, wherein each formula of said set of formulas has a right side and a left side, wherein said right side is to be evaluated to values that are assigned to cells of said away that are indicated by said left side;
   wherein the away has one or more dimensions that correspond to columns of the relation;
   wherein the query includes a clause specifying at least one partition column of said relation by which to partition the relation into partitions;
   assigning a plurality of partitions to processing elements for processing, wherein the relation is partitioned into said plurality of partitions based on a set of one or more partition columns that include said at least one partition column; and
   processing said query based on the assignment of said plurality of partitions;
   wherein the steps of the method are performed by one or more computer systems.

2. The method of claim 1, wherein:
   a dimension of said one or more dimensions correspond to a dimension column in said relation;
   the method further includes the steps of:
      determining whether each formula of said set of formulas satisfy one or more criteria, wherein the one or more criteria include that for each value of the dimension referenced by the left side by said each formula, the value referenced on the right side of said each formula for said dimension is the same as said each value referenced on the left side;
   if said each formula of said set of formulas satisfy one or more criteria, then performing the step of assigning based on a set of one or more partition columns that include said at least one partition column and the dimension column.

3. The method of claim 2, wherein:
   the one or more criteria include that for each formula of said set of formulas, said each formula references all values of the dimension on the left side of said each formula; and
   if said each formula of said set of formulas satisfy the one or more criteria, then
   rewriting said query by rewriting:
   the clause to specify the dimension, and
   the set of formulas by removing references to the dimension.

4. The method of claim 2, wherein:
the one or more criteria include that for each formula of said set of formulas said each formula references all values of the dimension on the left side of said each formula; and
if said each formula of said set of formulas does not satisfy said one or more criteria, then rewriting said query by rewriting:
the clause to specify the dimension.

5. The method of claim 4, wherein:
the query specifies an operation that can cause rows corresponding to cells of said away to be inserted;
wherein the set of formulas includes a formula that references a specific value in said dimension;
wherein the step of assigning a plurality of partitions to processing elements includes assigning a particular partition to a particular processing element;
before said particular processing element evaluates a particular formula, determining based on said specific value whether said particular formula modifies data that belongs to the partition; and
if said formula does not modify data that belongs to the partition, then foregoing execution of the particular formula.

6. The method of claim 5, including means for determining based on said specific value whether said formula modifies data that belongs to the particular partition.

7. The method of claim 1, including means for assigning a plurality of partitions to processing elements for processing and processing said query based on the assignment.

8. A computer-implemented method for evaluating a set of formulas defined by a query, the method comprising steps of:
examining said query;
wherein said query evaluates to a relation;
wherein the query defines an away and the set of formulas;
wherein the set of formulas reference the array;
wherein the array has one or more dimensions that correspond to columns of the relation;
grouping the set of formulas into levels, wherein each level includes one or more formulas of said set of formulas, wherein the levels satisfy a first set of one or more criteria, wherein said first set of one or more criteria include:
evaluation of any formula in each level of said levels does not depend:
on another formula in a same level, and
on another formula in a level higher than said each level;
evaluating the formulas in each of the levels, wherein:
the one or more formulas in the level are evaluated before another formula in a higher level is evaluated; and
if said each level includes one or more formulas that specify an aggregate function, computing each aggregate function specified by the one or more formulas before evaluating a formula in said each level;
wherein the steps of the method are performed by one or more computer systems.

9. The method of claim 8, wherein:
determining if the set of formulas satisfy second one or more criteria, wherein the second one or more criteria include:
no formula in said set of formulas references a range of values in each dimension of said one or more dimension; and
each aggregate function specified by the set of formulas has an inverse;
if said set of formulas satisfy second one or more criteria, then:
before evaluating any formula of the set of formulas, computing each aggregate function specified by the set of formulas to generate a result for said each aggregate function;
after computing each aggregate function and in response to detecting that evaluation of a formula from said set of formulas changes a measure of a cell upon which the result of a particular aggregate function depends, modifying the result for said particular aggregate function by applying a current value of the measure and a inverse of the old value of the measure.

10. The method of claim 9, further including:
storing in association with a particular cell modified by a formula from said set of formulas, a list of aggregate functions affected by changes to the measure of said particular cell; and
using said list to determine which aggregate functions have a result affected by a change to the measure of said particular cell.

11. The method of claim 8, wherein the step of evaluating the formulas in each of the levels includes a means for evaluating the formulas.

12. A computer-implemented method for evaluating a set of formulas defined by a query, the method comprising steps of:
examining said query;
wherein said query evaluates to a relation;
wherein the query defines an away and the set of formulas;
wherein the set of formulas reference the array;
wherein the array has one or more dimensions that correspond to columns of the relation;
establishing a subset of said set of formulas as not being acyclic;
grouping the set of formulas into levels, wherein each level includes one or more formulas of said set of formulas,
wherein the step of grouping includes assigning each formula of said subset to consecutive levels;
wherein the levels satisfy a first set of one or more criteria, wherein said first set of one or more criteria include:
if a particular level of said levels belongs to the consecutive levels, evaluation of the formula in the particular level does not depend on a formula in a higher level that does not belong to the consecutive levels;
if the particular level of said levels does not belong to the consecutive levels, then:
evaluation of any formula in the particular level of said levels does not depend:
on another formula in the particular level, and
on another formula in a level higher than said particular level; and
evaluating the set of formulas in an order based on said levels, wherein the step of evaluating includes determining whether the formulas in a subset converge;
wherein the steps of the method are performed by one or more computer systems.

13. The method of claim 12, wherein the step of determining whether said formulas in the subset converge includes:
as a first iteration, evaluating each formula in the consecutive levels;
determining as N a number of cells modified during the first iteration;
performing no more than N-12 iterations, wherein in each iteration of the N-12 iterations, each formula in the consecutive levels is evaluated;

detecting that the formulas in the consecutive levels converge after a particular iteration; and foregoing additional iterations in response to detecting that the formulas in the consecutive levels converge.

14. The method of claim 13, wherein:

a first flag is associated with cells of the array referenced by the formulas in the consecutive levels;

evaluation of a particular formula during a particular iteration of said no more than N-12 iterations causes setting of a particular first flag associated with a cell that is referenced by the particular formula but not modified by the particular formula; and in response to detecting that a value of the cell for which the particular first flag has been set was changed by the evaluation of a formula made in the particular iteration, performing another iteration of said N-12 iterations.

15. The method of claim 14, wherein:

a second flag in addition to said first flag is associated with cells of the array referenced by the formulas in the consecutive levels; and unsetting one of the first and second flags associated with a cell of the array when setting the other of the first and second flags.

16. The method of claim 12, wherein the method further includes the steps of:

generating a node graph with edges between nodes;

wherein the nodes each correspond to a particular formula of said set of formulas;

wherein an edge from a first node to a second node represents that the formula associated with the first node is dependant on the formula associated with the second node; and wherein the step of establishing a subset of said set of formulas as not being acyclic includes using the node graph to determine that the subset corresponds to a set of strongly connected components.

17. The method of claim 12, wherein the step of evaluating the set of formulas includes a means for determining whether said formulas in the subset converge.

18. A computer-implemented method for accessing data needed to process a query, the method comprising steps of:

examining said query;

wherein said query evaluates to a relation with rows;

wherein the query defines an array with cells and a set of formulas that reference the array;

wherein the array has one or more dimensions that correspond to a column of the relation as a dimension column;

wherein each cell of said cells corresponds to a row in said relation;

wherein the query includes a clause specifying at least one partition column of said relation by which to partition the relation into partitions that each contain rows within said relation;

accessing data for each partition in a multi-level hash access structure having a first level and a second level and a plurality of tables;

wherein the first level correlates each partition of said partitions to a particular table of said plurality of tables based on values in said at least one partition column, said particular table containing records holding data for the cells of said array the correspond to said each partition; and wherein the second level correlates records within the particular table for a partition to values in the one or more dimension columns;

wherein the steps of the method are performed by one or more computer systems.

19. The method of claim 18, wherein the method includes:

determining a number of partitions for which to evaluate said set of formulas based on an estimate of:

(1) an amount of memory available to store a set of tables from said plurality of tables, and (2) an amount memory needed to store said set of tables;

in response to determining said number of partitions, evaluating formulas for said number of partitions.

20. The method of claim 18, wherein the method further includes:

determining which rows are required to evaluate said set of formulas; and building a table of said plurality of tables based on the rows required to evaluate said set of formulas.

21. The method of claim 20, wherein the step of determining which rows are required includes means for determining which rows are required based on a bounding rectangle.

22. The method of claim 18, wherein records within a table of said plurality of tables are clustered based on said one or more dimension columns and the at least one partition column.

23. The method of claim 18, wherein the method includes:

evaluating a particular formula of said set of formulas;

wherein said particular formula references a cell and, for said cell, a value for each of said one or more dimension columns; and accessing the multi-level hash access structure based on said value for each of said one or more dimension columns.

24. The method of claim 18, the method including performing one or more operations involving records in the particular table, said one or more operations including at least one from a set that includes probe, update, upsert, insert, and scan.

25. The method of claim 18, wherein said multi-level hash access structure includes means for a two-level hash access structure.

26. A computer-readable volatile or non-volatile medium storing one or more sequences of instructions for processing a query, which instructions, when executed by one or more processors, cause the one or more processors to perform steps of:

examining said query;

wherein said query evaluates to a relation;

wherein the query defines an away and a set of formulas that reference the array, wherein each formula of said set of formulas has a right side and a left side, wherein said right side is to be evaluated to values that are assigned to cells of said away that are indicated by said left side;

wherein the away has one or more dimensions that correspond to columns of the relation;

wherein the query includes a clause specifying at least one partition column of said relation by which to partition the relation into partitions;

assigning a plurality of partitions to processing elements for processing, wherein the relation is partitioned into said plurality of partitions based on a set of one or more partition columns that include said at least one partition column; and processing said query based on the assignment of said plurality of partitions.

27. The computer-readable volatile or non-volatile medium of claim 26, wherein:

a dimension of said one or more dimensions correspond to a dimension column in said relation; and the one or more sequences of instructions further include instructions which, when executed by the one or more processors, cause the one or more processors to perform the steps of:

determining whether each formula of said set of formulas satisfy one or more criteria, wherein the one or more criteria include that for each value of the dimension referenced by the left side by said each formula, the value referenced on the right side of said each formula for said dimension is the same as said each value referenced on the left side; and if said each formula of said set of formulas satisfy one or more criteria, then assigning the plurality of partitions to the processing elements for processing based on a set of one or more partition columns that include said at least one partition column and the dimension column.

28. The computer-readable volatile or non-volatile medium of claim 27, wherein:

the one or more criteria include that for each formula of said set of formulas, said each formula references all values of the dimension on the left side of said each formula; and the one or more sequences of instructions further include instructions which, when executed by the one or more processors, cause the one or more processors to perform the step of rewriting said query when said each formula of said set of formulas satisfy the one or more criteria, the step of rewriting including rewriting of:

the clause to specify the dimension, and the set of formulas by removing references to the dimension.

29. The computer-readable volatile or non-volatile medium of claim 27, wherein:

the one or more criteria include that for each formula of said set of formulas said each formula references all values of the dimension on the left side of said each formula; and the one or more sequences of instructions further include instructions which, when executed by the one or more processors, cause the one or more processors to perform the step of rewriting said query when said each formula of said set of formulas does not satisfy said one or more criteria, the step of rewriting including rewriting of:

the clause to specify the dimension.

30. The computer-readable volatile or non-volatile medium of claim 29, wherein:

the query specifies an operation that can cause rows corresponding to cells of said away to be inserted;

wherein the set of formulas includes a formula that references a specific value in said dimension;

wherein the instructions that cause the one or more processors to perform assigning a plurality of partitions to processing elements include instructions which, when executed by the one or more processor, cause the one or more processors to perform assigning a particular partition to a particular processing element; and the one or more sequences of instructions further include instructions which, when executed by the one or more processors, cause the one or more processors to perform:

before said particular processing element evaluates a particular formula, determining based on said specific value whether said particular formula modifies data that belongs to the partition; and if said formula does not modify data that belongs to the partition, then foregoing execution of the particular formula.

31. The computer-readable volatile or non-volatile medium of claim 30, including means for determining based on said specific value whether said formula modifies data that belongs to the particular partition.

32. The computer-readable volatile or non-volatile medium of claim 26, including means for assigning a plurality of partitions to processing elements for processing and processing said query based on the assignment.

33. A computer-readable volatile or non-volatile medium storing one or more sequences of instructions for evaluating a set of formulas defined by a query, which instructions, when executed by one or more processors, cause the one or more processors to perform steps of:

examining said query;

wherein said query evaluates to a relation;

wherein the query defines an away and the set of formulas;

wherein the set of formulas reference the array;

wherein the away has one or more dimensions that correspond to columns of the relation;

grouping the set of formulas into levels, wherein each level includes one or more formulas of said set of formulas, wherein the levels satisfy a first set of one or more criteria, wherein said first set of one or more criteria include:

evaluation of any formula in each level of said levels does not depend:

on another formula in a same level, and on another formula in a level higher than said each level;

evaluating the formulas in each of the levels, wherein:

the one or more formulas in the level are evaluated before another formula in a higher level is evaluated; and if said each level includes one or more formulas that specify an aggregate function, computing each aggregate function specified by the one or more formulas before evaluating a formula in said each level.

34. The computer-readable volatile or non-volatile medium of claim 33, wherein the one or more sequences of instructions further comprise instructions which, when executed by one or more processors, cause the one or more processors to perform the steps of:

determining if the set of formulas satisfy second one or more criteria, wherein the second one or more criteria include:

no formula in said set of formulas references a range of values in each dimension of said one or more dimension; and each aggregate function specified by the set of formulas has an inverse; and if said set of formulas satisfy second one or more criteria, then:

before evaluating any formula of the set of formulas, computing each aggregate function specified by the set of formulas to generate a result for said each aggregate function;

after computing each aggregate function and in response to detecting that evaluation of a formula from said set of formulas changes a measure of a cell upon which the result of a particular aggregate function depends, modifying the result for said particular aggregate function by applying a current value of the measure and a inverse of the old value of the measure.

35. The computer-readable volatile or non-volatile medium of claim 34, wherein the one or more sequences of instructions further comprise instructions which, when executed by one or more processors, cause the one or more processors to perform the steps of:
- storing in association with a particular cell modified by a formula from said set of formulas, a list of aggregate functions affected by changes to the measure of said particular cell; and
- using said list to determine which aggregate functions have a result affected by a change to the measure of said particular cell.

36. The computer-readable volatile or non-volatile medium of claim 33, wherein the instructions that cause the one or more processors to perform the step of evaluating the formulas in each of the levels further comprise instructions which, when executed by the one or more processors, cause the one or more processors to provide a means for evaluating the formulas.

37. A computer-readable volatile or non-volatile medium storing one or more sequences of instructions for evaluating a set of formulas defined by a query, which instructions, when executed by one or more processors, cause the one or more processors to perform steps of:
- examining said query;
- wherein said query evaluates to a relation;
- wherein the query defines an away and the set of formulas;
- wherein the set of formulas reference the array;
- wherein the away has one or more dimensions that correspond to columns of the relation;
- establishing a subset of said set of formulas as not being acyclic;
- grouping the set of formulas into levels, wherein each level includes one or more formulas of said set of formulas,
- wherein the step of grouping includes assigning each formula of said subset to consecutive levels;
- wherein the levels satisfy a first set of one or more criteria, wherein said first set of one or more criteria include:
  - if a particular level of said levels belongs to the consecutive levels, evaluation of the formula in the particular level does not depend on a formula in a higher level that does not belong to the consecutive levels;
  - if the particular level of said levels does not belong to the consecutive levels, then:
    - evaluation of any formula in the particular level of said levels does not depend:
      - on another formula in the particular level, and
      - on another formula in a level higher than said particular level; and
- evaluating the set of formulas in an order based on said levels, wherein the step of evaluating includes determining whether the formulas in a subset converge.

38. The computer-readable volatile or non-volatile medium of claim 37, wherein the instructions that cause the one or more processors to perform the step of determining whether said formulas in the subset converge further include instructions which, when executed by the one or more processors, cause the one or more processors to perform the steps of:
- as a first iteration, evaluating each formula in the consecutive levels;
- determining as N a number of cells modified during the first iteration;
- performing no more than N-12 iterations, wherein in each iteration of the N-12 iterations, each formula in the consecutive levels is evaluated;
- detecting that the formulas in the consecutive levels converge after a particular iteration; and
- foregoing additional iterations in response to detecting that the formulas in the consecutive levels converge.

39. The computer-readable volatile or non-volatile medium of claim 38, wherein:
- a first flag is associated with cells of the array referenced by the formulas in the consecutive levels;
- evaluation of a particular formula during a particular iteration of said no more than N-12 iterations causes setting of a particular first flag associated with a cell that is referenced by the particular formula but not modified by the particular formula; and
- in response to detecting that a value of the cell for which the particular first flag has been set was changed by the evaluation of a formula made in the particular iteration, performing another iteration of said N-12 iterations.

40. The computer-readable volatile or non-volatile medium of claim 39, wherein:
- a second flag in addition to said first flag is associated with cells of the array referenced by the formulas in the consecutive levels; and
- unsetting one of the first and second flags associated with a cell of the array when setting the other of the first and second flags.

41. The computer-readable volatile or non-volatile medium of claim 37, wherein the one or more sequences of instructions further include instructions which, when executed by the one or more processors, cause the one or more processors to perform the steps of:
- generating a node graph with edges between nodes;
- wherein the nodes each correspond to a particular formula of said set of formulas;
- wherein an edge from a first node to a second node represents that the formula associated with the first node is dependant on the formula associated with the second node; and
- wherein the instructions that cause the one or more processors to perform the step of establishing a subset of said set of formulas as not being acyclic includes instructions which, when executed by the one or more processors, cause the one or more processors to perform the step of using the node graph to determine that the subset correspond to a set of strongly connected components.

42. The computer-readable volatile or non-volatile medium of claim 37, wherein the instructions that cause the one or more processors to perform the step of evaluating the set of formulas include instructions which, when executed by the one or more processors, cause the one or more processors to provide a means for determining whether said formulas in the subset converge.

43. A computer-readable volatile or non-volatile medium storing one or more sequences of instructions for accessing data needed to process a query, which instructions, when executed by one or more processors, cause the one or more processors to perform steps of:
- examining said query;
- wherein said query evaluates to a relation with rows;
- wherein the query defines an array with cells and a set of formulas that reference the array;
- wherein the array has one or more dimensions that correspond to a column of the relation as a dimension column;
- wherein each cell of said cells corresponds to a row in said relation;
- wherein the query includes a clause specifying at least one partition column of said relation by which to partition the relation into partitions that each contain rows within said relation;
- accessing data for each partition in a multi-level hash access structure having a first level and a second level and a plurality of tables;

wherein the first level correlates each partition of said partitions to a particular table of said plurality of tables based on values in said at least one partition column, said particular table containing records holding data for the cells of said array the correspond to said each partition; and wherein the second level correlates records within the particular table for a partition to values in the one or more dimension columns.

44. The computer-readable volatile or non-volatile medium of claim 43, wherein the one or more sequences of instructions further include instructions which, when executed by the one or more processors, cause the one or more processors to perform the steps of:

determining a number of partitions for which to evaluate said set of formulas based on an estimate of:
(1) an amount of memory available to store a set of tables from said plurality of tables, and
(2) an amount memory needed to store said set of tables;
in response to determining said number of partitions, evaluating formulas for said number of partitions.

45. The computer-readable volatile or non-volatile medium of claim 43, wherein the one or more sequences of instructions further include instructions which, when executed by the one or more processors, cause the one or more processors to perform the steps of:

determining which rows are required to evaluate said set of formulas; and
building a table of said plurality of tables based on the rows required to evaluate said set of formulas.

46. The computer-readable volatile or non-volatile medium of claim 45, wherein the instructions that cause the one or more processors to perform the step of determining which rows are required further include instructions which, when executed by the one or more processors, cause the one or more processors to provide means for determining which rows are required based on a bounding rectangle.

47. The computer-readable volatile or non-volatile medium of claim 43, wherein records within a table of said plurality of tables are clustered based on said one or more dimension columns and the at least one partition column.

48. The computer-readable volatile or non-volatile medium of claim 43, wherein the one or more sequences of instructions further include instructions which, when executed by the one or more processors, cause the one or more processors to perform the steps of:

evaluating a particular formula of said set of formulas;
wherein said particular formula references a cell and, for said cell, a value for each of said one or more dimension columns; and
accessing the multi-level hash access structure based on said value for each of said one or more dimension columns.

49. The computer-readable volatile or non-volatile medium of claim 43, wherein the one or more sequences of instructions further include instructions which, when executed by the one or more processors, cause the one or more processors to perform the steps of performing one or more operations involving records in the particular table, said one or more operations including at least one from a set that includes probe, update, upsert, insert, and scan.

50. The computer-readable volatile or non-volatile medium of claim 43, wherein said multi-level hash access structure includes means for a two-level hash access structure.

* * * * *

UNITED STATES PATENT AND TRADEMARK OFFICE
CERTIFICATE OF CORRECTION

| | | |
|---|---|---|
| PATENT NO. | : 7,761,403 B2 | Page 1 of 2 |
| APPLICATION NO. | : 10/703412 | |
| DATED | : July 20, 2010 | |
| INVENTOR(S) | : Andrew Witkowski et al. | |

It is certified that error appears in the above-identified patent and that said Letters Patent is hereby corrected as shown below:

In column 8, line 14, delete "f" and insert -- f, --, therefor.

In column 8, line 55, delete "cylic" and insert -- cyclic --, therefor.

In column 9, line 5, delete "if f" and insert -- iff --, therefor.

In column 11, line 50, delete "the the" and insert -- the --, therefor.

In column 15, line 55, delete "SPREADSHEEt" and insert -- SPREADSHEET --, therefor.

In column 20, line 48, delete "if f" and insert -- iff --, therefor.

In column 24, line 20, in claim 1, delete "away" and insert -- array --, therefor.

In column 24, line 24, in claim 1, delete "away" and insert -- array --, therefor.

In column 24, line 25, in claim 1, delete "away" and insert -- array --, therefor.

In column 24, line 41, in claim 2, delete "correspond" and insert -- corresponds --, therefor.

In column 25, line 12, in claim 5, delete "away" and insert -- array --, therefor.

In column 25, line 35, in claim 8, delete "away" and insert -- array --, therefor.

In column 26, line 30, in claim 12, delete "away" and insert -- array --, therefor.

In column 28, line 46, in claim 26, delete "away" and insert -- array --, therefor.

In column 28, line 50, in claim 26, delete "away" and insert -- array --, therefor.

In column 28, line 51, in claim 26, delete "away" and insert -- array --, therefor.

In column 28, line 66, in claim 27, delete "correspond" and insert -- corresponds --, therefor.

Signed and Sealed this
Third Day of May, 2011

David J. Kappos
*Director of the United States Patent and Trademark Office*

CERTIFICATE OF CORRECTION (continued)
U.S. Pat. No. 7,761,403 B2

In column 29, line 49, in claim 30, delete "away" and insert -- array --, therefor.

In column 30, line 16, in claim 33, delete "away" and insert -- array --, therefor.

In column 30, line 18, in claim 33, delete "away" and insert -- array --, therefor.

In column 31, line 24, in claim 37, delete "away" and insert -- array --, therefor.

In column 31, line 26, in claim 37, delete "away" and insert -- array --, therefor.

In column 32, line 39-40, in claim 41, delete "correspond" and insert -- corresponds --, therefor.